(12) United States Patent
Ding et al.

(10) Patent No.: US 10,157,634 B2
(45) Date of Patent: Dec. 18, 2018

(54) MAGNETIC READER SENSOR WITH SHIELD SPACING IMPROVEMENT AND BETTER PIN FLIP ROBUSTNESS

(71) Applicant: Headway Technologies, Inc., Milpitas, CA (US)

(72) Inventors: Ruhang Ding, Pleasanton, CA (US); Yewhee Chye, Hayward, CA (US); Wenyu Chen, San Jose, CA (US); Kunliang Zhang, Fremont, CA (US); Yan Wu, Cupertino, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/790,342

(22) Filed: Oct. 23, 2017

(65) Prior Publication Data

US 2018/0130487 A1    May 10, 2018

Related U.S. Application Data

(62) Division of application No. 15/345,813, filed on Nov. 8, 2016, now Pat. No. 9,799,357.

(51) Int. Cl.
*G11B 5/39* (2006.01)
(52) U.S. Cl.
CPC ............ *G11B 5/3912* (2013.01); *G11B 5/398* (2013.01); *G11B 5/3932* (2013.01)
(58) Field of Classification Search
None
See application file for complete search history.

(56) References Cited

U.S. PATENT DOCUMENTS

| | | | |
|---|---|---|---|
| 7,952,839 B2 | 5/2011 | Yamazaki et al. | |
| 8,233,233 B1 | 7/2012 | Shen et al. | |
| 8,582,249 B2 | 11/2013 | Sapozhnikov et al. | |
| 8,675,318 B1 * | 3/2014 | Ho | G11B 5/398 360/324.11 |
| 8,711,528 B1 * | 4/2014 | Xiao | G11B 5/3909 360/122 |
| 8,921,126 B2 | 12/2014 | Quan et al. | |
| 9,041,391 B2 | 5/2015 | Gao et al. | |
| 9,123,886 B2 | 9/2015 | Zhang et al. | |
| 9,230,577 B2 | 1/2016 | Zhang et al. | |

(Continued)

*Primary Examiner* — William J Klimowicz
(74) *Attorney, Agent, or Firm* — Saile Ackerman LLC; Stephen B. Ackerman

(57) ABSTRACT

A process flow is disclosed for forming a MR sensor having an antiferromagnetic (AFM) layer recessed behind a bottom shield to reduce reader shield spacing and improve pin related noise. An AP2/AFM coupling layer/AP1 stack that extends from an air bearing surface to the MR sensor backside is formed above the AFM layer. The AP2 layer is pinned by the AFM layer, and the AP1 layer serves as a reference layer to an overlying free layer during a read operation. The AP1 and AP2 layers have improved resistance to magnetization flipping because back portions thereof have a full cross-track width "w" between MR sensor sides thereby enabling greater pinning strength from the AFM layer. Front portions of the AP1/AP2 layers lie under the free layer and have a track width less than "w". The bottom shield may have an anti-ferromagnetic coupling structure.

10 Claims, 8 Drawing Sheets

(56) References Cited

U.S. PATENT DOCUMENTS

| | | | |
|---|---|---|---|
| 9,286,921 B1 | 3/2016 | Sapozhnikov et al. | |
| 9,305,578 B1 | 4/2016 | Singleton et al. | |
| 9,318,133 B2* | 4/2016 | Freitag | G11B 5/3909 |
| 9,337,414 B2 | 5/2016 | Li et al. | |
| 9,437,225 B2 | 9/2016 | Quan et al. | |
| 9,570,100 B1* | 2/2017 | Freitag | G11B 5/3912 |
| 9,799,357 B1* | 10/2017 | Ding | G11B 5/3912 |
| 9,830,935 B1* | 11/2017 | Gao | G11B 5/3906 |
| 9,870,790 B1* | 1/2018 | Hassan | G11B 5/3912 |
| 2005/0270703 A1* | 12/2005 | Hayakawa | G11B 5/39 360/324.1 |
| 2010/0232072 A1* | 9/2010 | Dimitrov | B82Y 25/00 360/319 |
| 2011/0032645 A1 | 12/2011 | Noel et al. | |
| 2012/0164486 A1 | 6/2012 | Bonhote et al. | |
| 2012/0276415 A1* | 11/2012 | Sapozhnikov | G01R 33/093 428/831 |
| 2013/0027032 A1 | 1/2013 | Gao et al. | |
| 2015/0221328 A1 | 8/2015 | Le et al. | |
| 2016/0035378 A1* | 2/2016 | Quan | G11B 5/127 428/811.2 |
| 2016/0196840 A1* | 7/2016 | Singleton | G11B 5/3932 216/22 |
| 2016/0293187 A1* | 10/2016 | Makino | G11B 5/3912 |
| 2017/0076743 A1* | 3/2017 | Hassan | G11B 5/3163 |

* cited by examiner

MAGNETIC READER SENSOR WITH SHIELD SPACING IMPROVEMENT AND BETTER PIN FLIP ROBUSTNESS

This is a Divisional application of U.S. patent application Ser. No. 15/345,813, filed on Nov. 8, 2016, which is herein incorporated by reference in its entirety, and assigned to a common assignee.

RELATED PATENT APPLICATIONS

This application is related to U.S. Pat. Nos. 7,952,839, 9,437,225; and 9,123,886; assigned to the same assignee and herein incorporated by reference in their entirety.

TECHNICAL FIELD

The present disclosure relates to a read head in which shield to shield spacing is reduced by recessing an antiferromagnetic (AFM) layer behind a shield layer to avoid exposing the AFM layer at an air bearing surface (ABS) plane, and pinning strength is made more robust by increasing the cross-track width of a back portion of the synthetic antiferromagnetic pinned (SyAP) layer that contacts the AFM layer without increasing the free layer width.

BACKGROUND

As the data areal density in hard disk drives (HDD) continuously increases because of technology improvements, the magnetoresistive (MR) sensor that is used as the read-back element in HDD is required to have increasingly better spacial resolution while maintaining a reasonable signal-to-noise ratio (SNR). The sensor is a critical component in which different magnetic states are detected by passing a sense current through the sensor and monitoring a resistance change. A common tunneling magnetoresistive (TMR) configuration includes two ferromagnetic layers that are separated by a non-magnetic spacer (tunnel barrier) in the sensor stack where the tunnel barrier is typically comprised of one or more metal oxides, metal oxynitrides, or metal nitrides. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields (such as a bit field from a magnetic medium track) and is aligned either parallel or anti-parallel to the magnetization in the pinned layer.

Referring to FIG. 1a, a portion of a conventional read head 90 is shown wherein a sensor element 4 is formed between a top shield 1 and bottom shield 2, and between hard bias structures 3 that are positioned on opposite sides of the sensor. Hard bias structures 3 have a longitudinal magnetization 42 to provide a biasing magnetic field on the sides of the sensor to orientate the free layer magnetization 43 (FIG. 1b) in the y-axis direction or in-plane direction in the absence of an external field. There is an insulation layer 20 to separate the sensor from the hard bias structures. The thickness of the sensor element is also referred to as the reader shield (shield to shield) spacing (RSS) 41. As sensor size becomes smaller in a cross-track direction to achieve higher areal density, it is critical to also reduce the RSS spacing (down-track direction) in order to improve bit error rate (BER).

In FIG. 1b, a conventional sensor element 4 is shown with a bottom spin valve configuration that has a seed layer 21, AFM layer 8, SyAP layer 25, tunnel barrier 10, free layer 5 having a magnetization direction 43, and a capping layer 11 that are sequentially formed on the bottom shield (not shown). The SyAP layer comprises an outer pinned layer AP2 7, a middle antiferromagnetic coupling layer 9, and an inner pinned layer AP1 6. As a result, the AP1 and AP2 pinned layers can deflect with a very large external field and thus the SyAP magnetization (not shown) is considerably less likely to be flipped (switched) than the free layer magnetization. In this case, the resistance of the sensor changes based on the relative alignment between the magnetization of AP1 and free layers. Sensor sidewalls 100 are aligned at an angle a with respect to a bottom surface 8b of the AFM layer and may vary from sloped (<90 degrees) to essentially vertical (90 degrees) depending on the nature of the etching process used to form the sidewalls.

Current efforts to further increase areal data density involve developing a greater data linear density along a down-track (z-axis) direction and a higher track density along the cross-track (y-axis) direction. The AFM layer, which provides bias to the pinned layer magnetization and high temperature stability, is generally one of the thickest layers in the sensor stack. Therefore, it is difficult to reduce RSS spacing without modifying the AFM design.

One skilled in the art recognizes that reducing RSS spacing 41 in FIG. 1a usually means the thickness of hard bias structure 3 must decrease accordingly. As a result, a thinner hard bias structure may lead to a weaker pinning field on the edges of free layer 5 (FIG. 1b) and thereby yield a less stable sensor 4. Meanwhile, magneto-static coupling between the hard bias structure and top shield 1 may become greater as RSS spacing decreases which can easily cause a rotation of hard bias magnetization 42 away from a longitudinal direction in the proximity of free layer. Thus, modification of the AFM layer and longitudinal biasing structure around the sensor must be carefully designed in order to avoid degrading the desired properties of the sensor stack layers and longitudinal biasing structure.

An improved read head design with reduced shield to shield spacing is needed that avoids compromising sensor and longitudinal biasing structure properties while improving pinned layer flip robustness to maintain the correct magnetization direction in the presence of external magnetic fields.

SUMMARY

One objective of the present disclosure is to provide a read head shield design and MR sensor structure wherein reader shield to shield spacing is reduced to enable higher areal density devices.

A second objective of the present disclosure is provide a MR sensor structure according to the first objective such that there is improved robustness in pinned layer magnetization stability in the MR sensor structure.

A third objective of the present invention is to provide a method of forming the MR sensor and read head shields of the first two objectives.

These objectives are achieved according to one embodiment in which a MR sensor has a first stack of layers including an AFM layer, and an overlying magnetic layer that is ferromagnetically pinned to the AFM layer where the first stack is recessed behind a bottom shield. A bottom shield top portion extends from the ABS to a first stripe height (h1) at a first plane that is parallel to the ABS. The first stack has a front side at the first plane and a backside at a second plane that is parallel to the first plane. Both of the bottom shield and first stack have a full cross-track width (w) between a first side of the MR sensor and an opposite side thereof. The MR sensor has a second stack of layers comprising a front portion formed above the bottom shield top portion between the ABS and first plane, and a back portion between the first and second planes. The second stack has a SyAP configuration comprised of a lower AP2 pinned layer front portion formed on a seed layer, and the back portion thereof contacting the first stack top surface, a middle anti-ferromagnetic coupling layer, and an uppermost AP1 layer each having a backside at the second plane. The back portion has a full cross-track width. However, the front portion of the SyAP configuration has a T shape with the bottom vertical part of the T having a second cross-track width w2 where w2<w, and extending from the ABS to a second stripe height (h2) where h2<h1, and an upper horizontal part of the T with a full cross-track width that adjoins the back portion along the first plane. Above the second stack front portion is a third stack of layers wherein a free layer has a track width (w1) where w1≤w2 depending on the slope of the MR sensor sidewalls.

The third stack includes a non-magnetic spacer such as a tunnel barrier contacting a top surface of the AP1 layer in the bottom part of the T shape, the free layer on the non-magnetic spacer, and a capping layer on the free layer each having a height substantially equal to h2. The third stack has two sidewalls extending to a backside that is at the second stripe height from the ABS. The AP1 and AP2 pinned layers in the second stack have a more robust resistance to unwanted magnetization flipping than in the prior art because of coupling to the pinned magnetic layer in the first stack along the full width in the back portion. Moreover, the upper part of the T shape in the front portion of the second stack adjoins a back portion thereof along a full width of the MR sensor at the first plane for improved coupling compared with previous designs.

In some embodiments, the magnetic layer formed on the AFM layer in the first stack is a single ferromagnetic layer that is pinned in the same direction as the magnetization in the AFM layer and overlying AP2 layer. However, the magnetic layer may have a SyAP configuration where two ferromagnetic sub-layers are separated by an anti-ferromagnetic coupling layer. Furthermore, the bottom shield top portion between the ABS and first stack may be comprised of a single magnetic layer or have a SyAP configuration.

A fabrication sequence for forming the MR sensor structure disclosed herein is also provided. After a MR sensor stack of layers comprising the second and third stacks is laid down on the bottom shield top portion and first stack of layers, a first photoresist layer is coated and patterned on the MR sensor stack to generate a photoresist mask with a backside formed above the desired backside of the capping layer, free layer, and non-magnetic spacer (third stack) at the second height. An ion beam etch (IBE) or reactive ion etch (RIE) is used to transfer the pattern through the third stack and stops at a top surface of the AP1 layer in the second stack. Thereafter, an insulation layer is deposited to fill the opening behind the third stack formed by the IBE or RIE. A chemical mechanical polish process may be employed to form a top surface on the insulation layer that is coplanar with a top surface of the third stack of layers.

In the following step, a second photoresist layer is coated on the second and third stacks and insulation layer and is patterned to form sidewalls. A second IBE or RIE is used to remove uncovered portions of the third stack and form sidewalls that are orthogonal to the ABS and extend to height h2. As a result, the free layer has a track width corresponding to w1. The RIE and IBE is continued to form sidewalls on the second stack such that the AP1 layer has track width w2 up to height h2. Typically, the second stack has sidewalls that are coplanar with those of the third stack but are non-vertical with respect to the underlying shield top surface.

Thereafter, a second insulation layer is deposited on exposed regions of the magnetic shield top surface and on the second and third stack sidewalls to partially fill the openings generated by the second etching process. Next, a longitudinal bias structure is deposited to fill the openings. A second CMP process may be performed to yield a top surface on the hard bias layer or junction shield that is coplanar with the top surface of the third stack. Finally, a top shield is formed on the MR sensor.

DETAILED DESCRIPTION

The present disclosure is a magnetoresistive (MR) read head in which a MR sensor structure has reduced shield to shield spacing as a result of recessing the AFM layer behind a bottom shield layer with respect to the ABS. The pinning strength of the SyAP pinned layer between the AFM layer and free layer in the MR sensor is improved by magnetic coupling through a full width back portion of the SyAP pinned layer that is behind the free layer backside. In all drawings, the y-axis is the cross-track direction where distance is expressed as a width, the z-axis is the down-track direction where distance is expressed as a thickness, and the x-axis is a direction orthogonal to the ABS and toward a back side of the read head where distance is given as stripe height or "height". The terms "isolation" and "insulation" may be used interchangeably when referring to the function of a dielectric material or layer placed between adjacent magnetic or metal layers. The read head may be formed in a combined read head/write head structure and is not limited to a specific write head design.

Figure 1A:
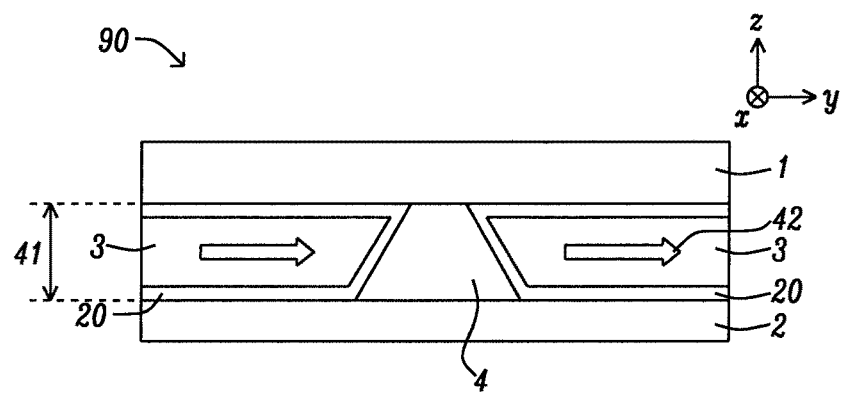
FIG. 1a is an ABS view of a prior art MR sensor formed between top and bottom shield, and having hard bias layers that provide longitudinal bias to stabilize a free layer in the MR sensor.
Figure 1B:
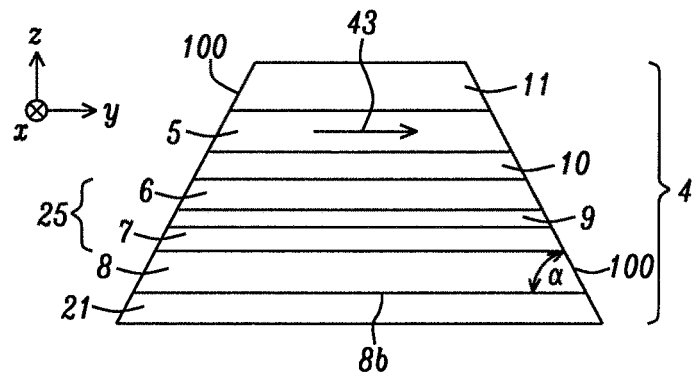
FIG. 1b is an enlarged view of the sensor in FIG. 1a and shows a free layer with magnetization that is stabilized in an in-plane direction.
Figure 2A:
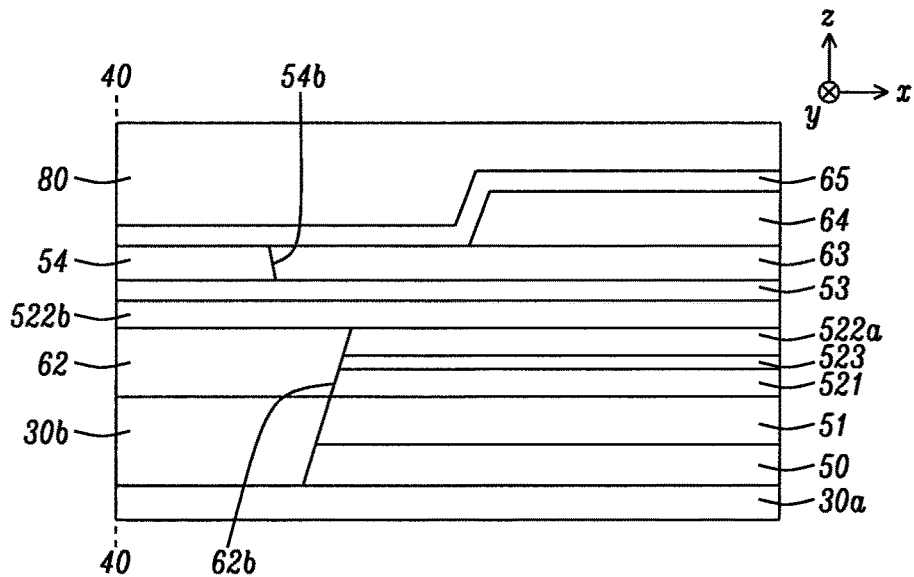
FIG. 2a is a down-track cross-sectional view of a prior art MR sensor wherein an AFM layer is recessed behind a magnetic shield to reduce reader shield-to-shield spacing.

We have previously disclosed MR sensor designs that place a recessed AFM layer behind the ABS plane in U.S. Pat. No. 7,952,839 and in U.S. Pat. No. 9,437,225. In one embodiment from U.S. Pat. No. 7,952,839 that is depicted in FIG. 2a, the AFM layer 51 is formed on an insulation layer 50, and has a front side that is recessed behind an upper portion 30b of bottom shield 30a, and therefore reduces shield-to-shield (RSS) spacing at the ABS. Above the AFM layer and behind a backside 62b of non-magnetic layer 62 is a SyAP structure where ferromagnetic layers 521, 522a are anti-ferromagnetically coupled through a coupling layer 523 such as Ru. A top portion of the SyAP structure is ferromagnetic (FM) layer 522b, which is formed on top surfaces of layers 62, 522a, and extends from the ABS 40-40 to a backside of the sensor structure. Above FM layer 522b at the ABS is a non-magnetic spacer 53, and a free layer 54. Isolation layer 63 adjoins a backside 54b of the free layer. Another isolation layer 65 separates a top surface of the free layer from the top shield 80 at the ABS.

Figure 2B:
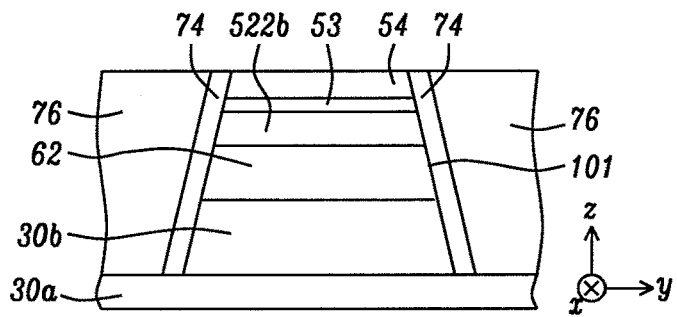
FIG. 2b is an ABS view of the MR sensor in FIG. 2a shows an insulation layer and adjoining hard bias layer on each side of the patterned MR sensor stack.

Referring to FIG. 2b, an ABS view of the sensor structure shown in FIG. 2a is illustrated where FM layer 522b, spacer 53, and free layer 54 are sequentially stacked on isolation layer 62. Sidewalls 101 are formed at the sides of the layers 62, 522b, 53, and 54, and at the sides of the upper portion 30b of the bottom shield. There is an isolation layer 74 adjoining sidewalls 101, and hard bias layer 76 at an outer side of isolation layer 74.

Figure 2C:
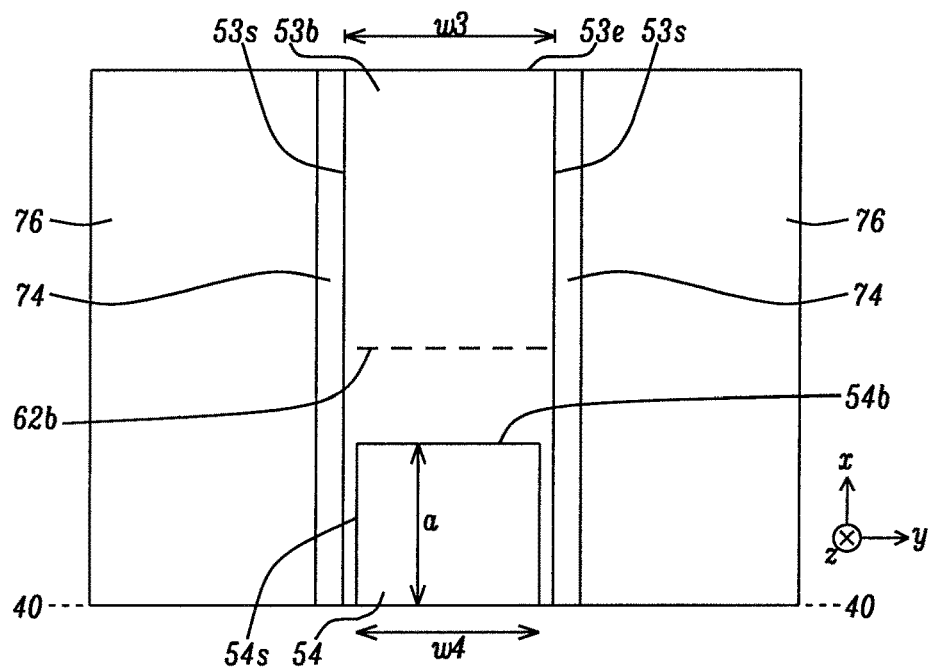
FIG. 2c is top-down view of the MR sensor in FIGS. 2a-2b wherein a spacer, and a pinned SyAP layer with an AP2/coupling/AP1 configuration have a constant cross-track width between the ABS and a back end of the sensor.

In FIG. 2c, a top-down view of the MR sensor in FIG. 2a is depicted with top shield 80 and isolation layers 63-65 removed. Free layer 54 has a cross-track width w4, and a backside 54b that is at height a from the ABS 40-40 while spacer 53 (and underlying FM layer 522b) extends from the ABS to a back end 53e and has a constant cross-track width w3 between sides 53s. In some cases, w3=w4 but usually the MR sensor has non-vertical sidewalls such that w3>w4. Isolation layer 74 also extends to a back end of the sensor. Free layer 54 may be deflected into the transverse direction with a bit field (from a magnetic medium track that is not shown) to cause a sensor resistance change. Note that spacer sides 53s, and sides 54s of the free layer are sections of the sidewalls 101 in FIG. 2b.

Since FM layer 522b is stabilized by underlying AFM layer 51 only in a back portion between non-magnetic layer backside 62b and a back end of the sensor, a front portion of FM layer 522b between the ABS 40-40 and backside 62b has a higher chance of flipping to the opposite (incorrect) direction upon external magnetic field excitation thereby causing an error bit read. This recessed AFM design is also associated with some concerns such as shield stability near the sensor, and a morphology effect on the overlying pinned layers. Moreover, external magnetic field excitation causes unacceptable bit read error due to the frequency of magnetization flipping to the opposite (incorrect) direction in the portion of FM layer 522b not aligned over AFM layer 51. Thus, further improvement in MR sensor design is needed to stabilize a greater portion of the FM layers in the SyAP structure and prevent unwanted flipping.

We have discovered a new recessed AFM design in a MR sensor that enables better magnetization stability in the AP1 and AP2 pinned layers wherein the AP1 layer serves as a reference layer for a free layer during a read process. As described in the following embodiments, the present disclosure takes advantage of a full width SyAP structure (AP1/AFM coupling layer/AP2) in a portion thereof that is behind the backside of a stack of layers that includes a non-magnetic spacer, the free layer, and capping layer.

Figure 3A:
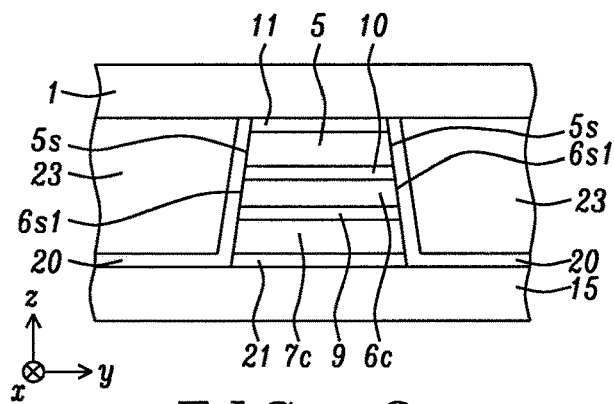
FIG. 3a is an ABS view of an embodiment of the present disclosure wherein a MR sensor with a recessed AFM layer is formed between top and bottom shields, and has side shields or hard bias layers adjacent to the MR sensor sidewalls.

According to a first embodiment of the present disclosure that is illustrated by an ABS view in FIG. 3a and represents a modification of the process of record (POR) described in FIGS. 2a-2c, there is a MR sensor stack of layers between a top portion 15 of a bottom shield and upper shield 1. The MR sensor stack at the ABS comprises a lower seed layer 21, a front portion of a SyAP pinned layer with configuration 7c/9/6c, a non-magnetic spacer 10 on the AP1 layer 6c, free layer 5 on the non-magnetic spacer, and an uppermost capping layer 11. Free layer sidewalls 5s are coplanar with sidewalls 6s1 on the AP1 layer. The AP1 layer is anti-ferromagnetically coupled through AFM coupling layer 9 to AP2 layer 7c.

Figure 3B:
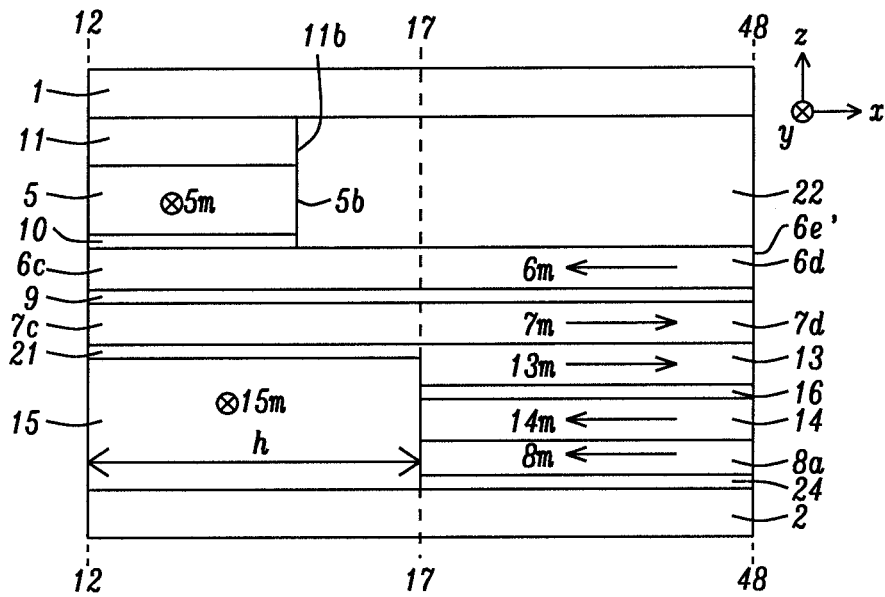
FIG. 3b is a down-track cross-sectional view of the MR sensor in FIG. 3a and depicts an AFM layer recessed behind a magnetic shield, the AFM layer pins an overlying ferromagnetic layer and determines the magnetization in the SyAP magnetic structure having an AP2/AFM coupling layer/AP1 configuration.

Referring to FIG. 3b, a down-track cross-sectional view is shown for the first embodiment in FIG. 3a. AFM layer 8a is effectively embedded in the bottom shield by adjoining a backside of bottom shield top portion 15 at plane 17-17 that is at height h from the ABS 12-12 thereby reducing shield to shield (RSS) spacing at the ABS. Preferably, the AFM layer is formed on a seed layer 24 that contacts a top surface of bottom shield 2 behind plane 17-17 with respect to the ABS. Above the AFM layer and behind the backside of bottom shield top portion 15 is a SyAP structure where ferromagnetic layers 13, 14 are antiferromagnetically (AFM) coupled through an AFM coupling layer 16 such as Ru. Thus, layers 24, 8a, 14, 16, 13 are sequentially laid down on bottom shield 2 and form a first stack with a front side at plane 17-17 and a backside at the back end of the sensor at plane 48-48.

A second stack of layers comprising a second SyAP configuration is formed on seed layer 21 above bottom shield top portion 15 and on a top surface of the first stack, and extends from the ABS 12-12 to the MR sensor back end. In one embodiment, seed layer 21 has a top surface that is coplanar with a top surface of FM layer 13. The second stack comprises a lower (outer) AP2 pinned layer with front portion 7c and back portion 7d each with magnetization 7m that is ferromagnetically coupled to magnetization 13m in the upper layer of the first SyAP configuration. There is also a middle AFM coupling layer 9, and an upper (inner) AP1 layer with front portion 6c and back portion 6d with back end 6e' each having magnetization 6m. The AP1 layer serves as a reference layer for free layer 5 in an overlying third stack featuring a lower non-magnetic spacer 10 that contacts the AP1 layer from the ABS to stripe height a where a<h, the free layer on the non-magnetic spacer, and an upper capping layer 11 each having stripe height a. Isolation layer 22 abuts a backside 5b of the free layer and backside 11b of the capping layer, and extends to a back end of the sensor structure at plane 48-48.

Free layer magnetization 5m is typically aligned longitudinally (parallel to ABS) in the absence of an external field while magnetizations 6m, 7m, 13m, 14m in the first and second SyAP configurations are oriented in a transverse direction with respect to the ABS. It should be understood that magnetization 7m in the back portion 7d of the AP2 layer behind plane 17-17 (which is parallel to the ABS 12-12) is effectively pinned by AFM layer 8a. Magnetization 6m in AP1 front portion 6c and AP1 back portion 6d is aligned anti-parallel to magnetization 7m in AP2 layer front portion 7c and AP2 back portion 7d, respectively. In this embodiment, magnetization 8m in AFM layer 8a is ferromagnetically coupled to magnetization 14m in ferromagnetic (FM) layer 14, and 14m is aligned opposite to magnetization 13m in FM layer 13 because of AFM coupling through AFM coupling layer 16. Note that 13m and 7m are aligned in the same direction due to ferromagnetic coupling between FM layer 13 and AP2 back portion 7d. In the exemplary embodiment, magnetization 5m in free layer 5 and magnetization 15m in bottom shield top portion 15 are oriented into the plane of the drawing in the absence of an external magnetic field.

Returning to FIG. 3a, an isolation layer 20 is formed on both sides of the MR sensor stack including free layer sides 5s, and AP1 layer sides 6s1, and on a top surface of bottom shield top portion 15 adjacent to the MR sensor stack. Magnetic layer 23 adjoins a side of isolation layer 20 that faces away from the MR sensor stack, and provides longitudinal biasing to the free layer. In some embodiments, the magnetic layer may comprise one or more layers that are CoFe, CoFeNi, NiFe, CoFeN, for example, that function as side shields (junction shields). Moreover, each junction shield may have two magnetic layers that are anti-ferromagnetically coupled through an AFM coupling layer that is Ru, Rh, Ir, or the like. The present disclosure also anticipates a laminated junction shield in a FM1/Ru/FM2/Ru/FM3 configuration, for example, that includes three ferromagnetic layers (FM1-FM3) and two AFM coupling layers as disclosed in related U.S. Pat. No. 9,123,886. In other embodiments, magnetic layer 23 is a hard bias material such as CrCoPt, CoPt, or FePt.

Figure 3C:
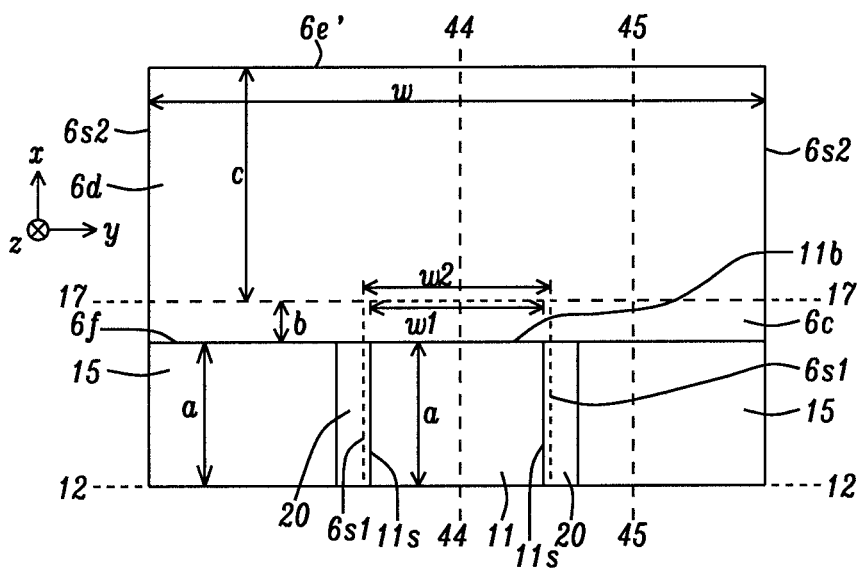
FIG. 3c is a top-down view of the structure in FIGS. 3a-3b with the magnetic biasing layer and isolation layers removed above the SyAP magnetic structure to depict the full width of the AP1, AP2, and AFM coupling layers behind the free layer and capping layer.

Referring to FIG. 3c where the MR sensor in FIG. 3a is shown from a top-down perspective with top shield 1, isolation layer 22, magnetic layer 23, and isolation layer 20 above the second stack removed, a key feature of the present disclosure is that the second stack of layers comprising the upper AP1 layer with front and back portions 6c, 6d, respectively, has a full width w of 0.1 to 3 microns between sides 6s2 and behind front sides 6f at height a. Front sides 6f of the AP1 layer 6c are shown on each side of a center plane 44-44 that is orthogonal to the ABS 12-12 and bisects the third stack of layers. Note that AP1 layer 6c, AFM coupling layer 9, and underlying AP2 layer 7c (not shown) have a T shape between the ABS and plane 17-17. The vertical part of the T is aligned orthogonal to the ABS and below the third stack of layers including capping layer 11, and has cross-track width w2 between sides 6s1 up to height a. Cross-track width w1 of the capping layer 11 at the top of the third stack may be less than w2 when sidewalls 101 in FIG. 3a are non-vertical. The horizontal (top) part of the T that adjoins a back end of the vertical part is a strip with height b of 1 to 100 nm and full cross-track width w between front sides 6f and plane 17-17. The height c of the SyAP structure including AP1 layer 6d between plane 17-17 and backside 6e' is about 0.1 to 3 microns.

Similar to the POR recessed AFM scheme, the SyAP layers 6c, 7c in the vertical part of the T shaped front portion are not directly stabilized by an underlying AFM layer 8a which lies only behind plane 17-17. However, there is improved stabilization in terms of better pin reliability of the SyAP structure over the POR design because underlying AFM layer 8a pins AP2 back portion 7d (through FM layers 13, 14) in a transverse direction through a full width w of the MR sensor, and AP1 back portion 6d is anti-ferromagnetically coupled to back portion 7d to maintain magnetization 6m in the desired direction. Furthermore, coupling is enhanced between the AP1 front and back portions 6c/6d, and between the AP2 front and back portions 7c/7d, respectively, through an interface along plane 17-17 having a full width w as opposed to coupling through a narrow interface having width w3 (tens of nm) in FIG. 2c. Thus, there is added stability since the horizontal part of the T shaped front portion 6c is AFM coupled with the horizontal part of the T shaped front portion 7c through a full width w of the MR sensor. We also found substantially less pin related noise that is responsible for a higher signal to noise ratio with the recessed AFM scheme disclosed herein.

AP1 layer 6c/6d and AP2 layer 7c/7d are generally Co, Fe, CoFe, or alloys thereof with additional elements such as B and Ni. In other embodiments, one or both AP1 and AP2 layers may be comprised of a laminated stack $(A1/A2)_n$ where A1 is Co or an alloy thereof, A2 is Co or an alloy thereof, and n is a lamination number>1. When a laminated stack $(A1/A2)_n$ is used for the AP1 layer, a transition layer (not shown) such as Co, CoFe/Co, or CoFeB/Co may be deposited on the AP1 layer to improve the lattice transition to the non-magnetic spacer 10. The present disclosure also anticipates that one or both AP1 and AP2 layers may be comprised of Co and Pt as in a L10 alloy or a $(Co/Pt)_n$ or $(Co/Pd)_n$ laminate. The backside of the MR sensor at plane 48-48 comprises a backside of the first stack of layers (8a, 13, 14, 16) and a backside of the second stack of layers (6d, 9, 7d). AFM layer 8a may be one of MnPt, IrMn, NiMn, OsMn, RuMn, RhMn, PdMn, RuRhMn, or MnPtPd or a combination thereof. Ferromagnetic layers 13, 14 may be selected from the same group of materials as described previously with respect to AP1 layer 6c/6d and AP2 layer 7c/7d. AFM coupling layer 16 is a material such as Ru, Rh, Ir, or the like that induces anti-ferromagnetic coupling between FM layers 13, 14.

Non-magnetic spacer 10 is preferably a metal such as Cu in a giant magneto-resistive (GMR) sensor, or a dielectric layer comprised of one or more metal oxide, metal oxynitride, or metal nitride layers in a tunneling magnetoresistive (TMR) sensor. In another embodiment, the non-magnetic spacer has a well known confining current pathway (CCP) configuration wherein metal pathways of Cu or another conductive metal are formed in a metal oxide matrix.

The free layer 5 may be selected from one of the materials previously described with respect to the AP1 and AP2 layers. In some embodiments, a non-magnetic insertion layer such as Ta may be formed between two magnetic layers in the free layer stack to dilute the magnetization saturation (Ms) value therein. In general, the free layer is chosen to enable a large (dR/R) ratio where R is the resistance of the MR sensor and dR is the change in resistance when an electrical "sense" current is applied in a read process. A higher MR ratio (dR/R) means a higher SNR and faster readout of the MR sensor's magnetic state.

In one aspect, capping layer 11 is comprised of one or more metal layers including Ta, and Ru although other non-magnetic layers used in the art are acceptable. In an alternative embodiment, the capping layer may have a CCP configuration as described previously, or a metal oxide composition such as MgO, TiOx, HfOx, or $Al_2O_3$, or laminates of one or more of the aforementioned metal oxides. However, with a metal oxide composition, capping layer thickness is typically limited to less than 20 Angstroms in order to maintain the resistance x area (RA) value within a desired range. Preferably, the capping layer contacts the top shield 1 to provide an electrical contact for a sense current (not shown) and is non-magnetic to prevent the top shield from disturbing free layer magnetization.

Figure 12:
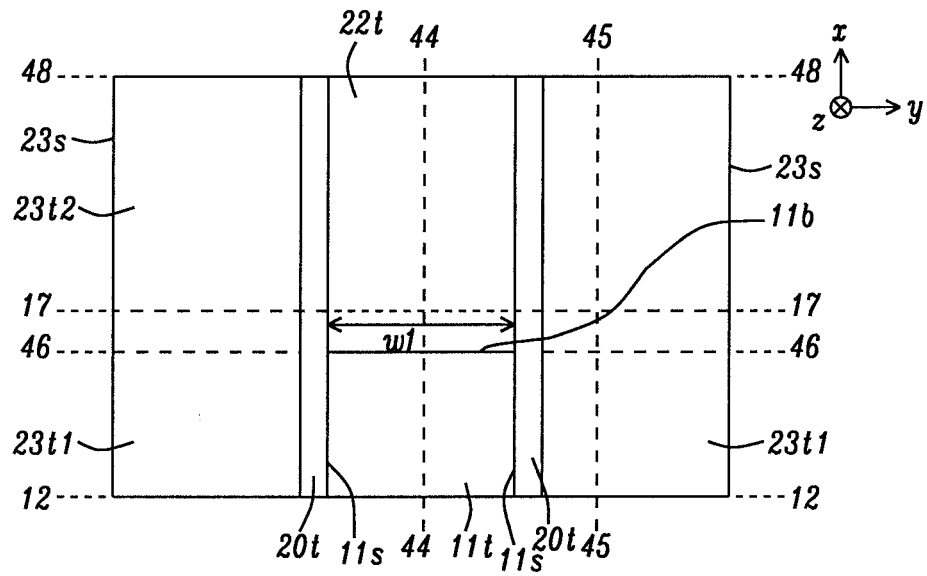
FIG. 12 is a top down view of the MR sensor structure in FIG. 11 after an isolation layer and longitudinal biasing structure are deposited on the MR sensor sidewalls.

Referring to FIG. 12, a top-down view of the sensor structure in FIG. 3a is shown with only the top shield 1 removed. Magnetic layer 23 and isolation layer 20 extend from the ABS 12-12 to a back end of the sensor structure.

Figure 3D:
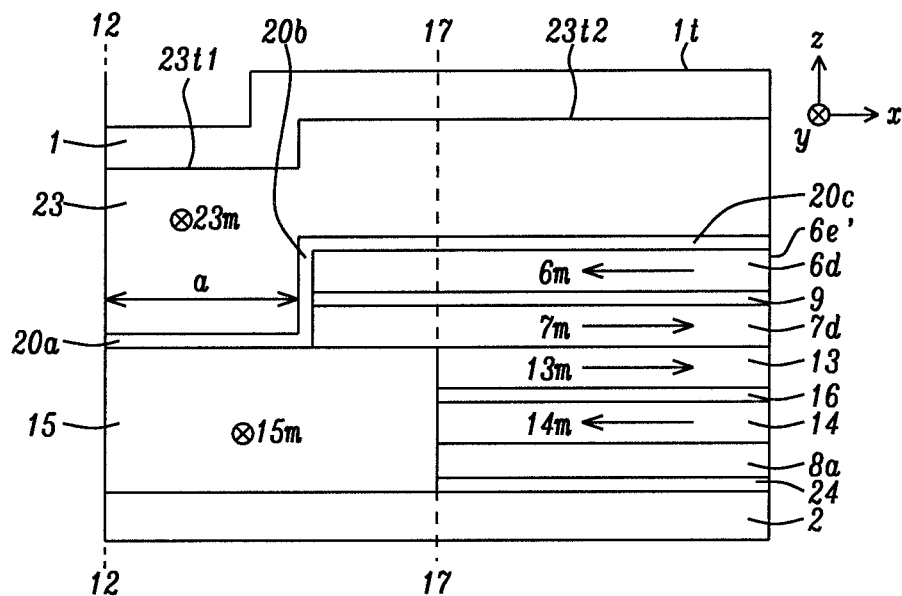
FIG. 3d is a down-track cross-sectional view of the MR sensor in FIGS. 3a-3c along a plane that is orthogonal to the ABS and intersects the hard bias layer or junction shield that is adjacent to the free layer in the MR sensor stack.

In FIG. 3d, a down-track cross-sectional view is depicted along plane 45-45 in FIG. 12. Isolation layer 20 is comprised of a front section 20a extending a height a from the ABS 12-12, a vertical middle section 20b adjoining a front side of layers 6d, 9, 7d at height a, and a back section 20c contacting a top surface of AP1 layer 6d and extending to a backside 6e' thereof. Magnetic layer 23 has a front portion with top surface 23t1 above isolation layer 20a and a back portion with top surface 23t2 formed on isolation layer 20c. In the exemplary embodiment, top surface 23t2 is a greater down-track distance from bottom shield 2 than top surface 23t1. Accordingly, top shield 1 may have a non-planar top surface it. Magnetic layer 23 has magnetization 23m that is preferably aligned in the same longitudinal direction as magnetization 15m.

Figure 4:
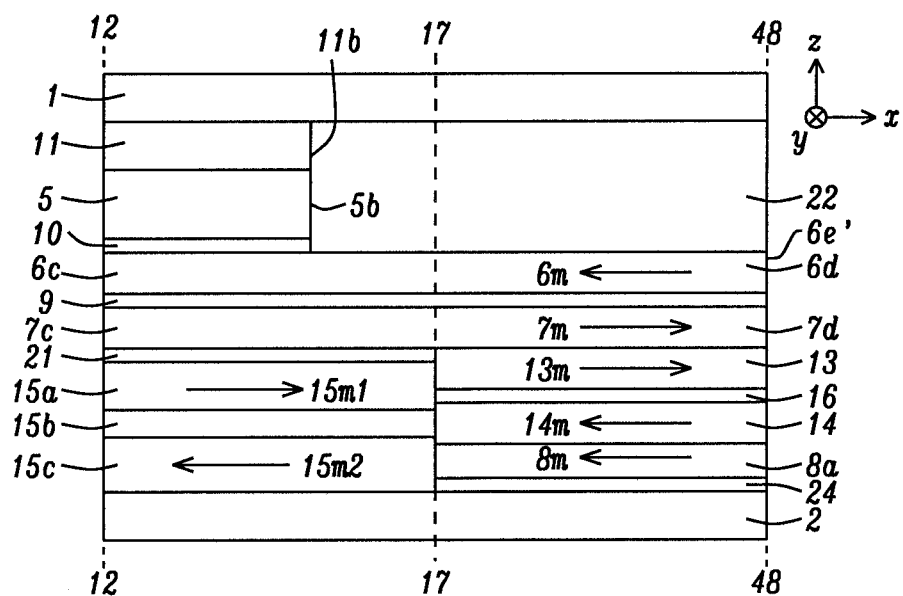
FIG. 4 is a down-track cross-sectional view showing an alternative embodiment to the MR sensor structure in FIG. 3b where the bottom shield top portion between the ABS and recessed AFM layer has a SyAP configuration.

According to another embodiment illustrated in FIG. 4, the MR sensor is retained from FIG. 3b except a single layer configuration in bottom shield 15 is replaced by an AFM coupled structure comprising a lower magnetic layer 15c contacting a top surface of bottom shield 2 at the ABS, a middle AFM coupling layer 15b, and an upper magnetic layer 15a. In one embodiment, upper magnetic layer has a magnetization 15m1 that is aligned in the same direction as magnetization 5m in free layer 5, and lower magnetic layer 15c has magnetization 15m2 aligned in the opposite direction to 15m1.

In another embodiment (not shown), there may be five layers in bottom shield 15 with a second AFM coupling layer and a third magnetic layer sequentially stacked on a top surface of magnetic layer 15a in the previous embodiment while maintaining the same down-track thickness as shown for the 15a/15b/15c configuration in FIG. 4. As a result, the lower magnetic layer and third magnetic layer have magnetizations in the same longitudinal direction as magnetization 5m, and the second magnetic layer 15a has a magnetization opposite to that of 5m.

Figure 5:
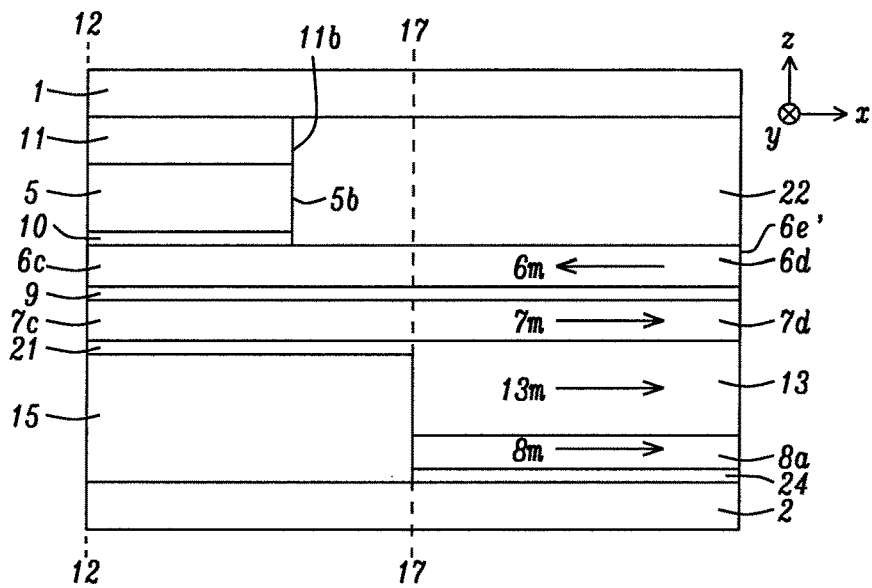
FIG. 5 is a down-track cross-sectional view showing an alternative embodiment to the MR sensor structure in FIG. 3b where the recessed AFM layer pins an overlying ferromagnetic (FM) layer that is directly coupled to the AP2 layer in the SyAP magnetic structure.

In another embodiment of the MR sensor structure of the present disclosure illustrated in FIG. 5, the read head structure shown in FIG. 3b is retained except for omitting AFM coupling layer 16 and lower ferromagnetic layer 14. As a result, there is a single ferromagnetic layer 13 behind plane 17-17 and between AFM layer 8a and AP2 layer back portion 7d. FM layer 13 contacts a top surface of the AFM layer, and is thereby ferromagnetically coupled to the AFM layer such that magnetization 13m is pinned in the same direction as magnetization 8m. Thus, magnetizations 8m, 13m, and 7m are all aligned in the same transverse direction.

Figure 6:
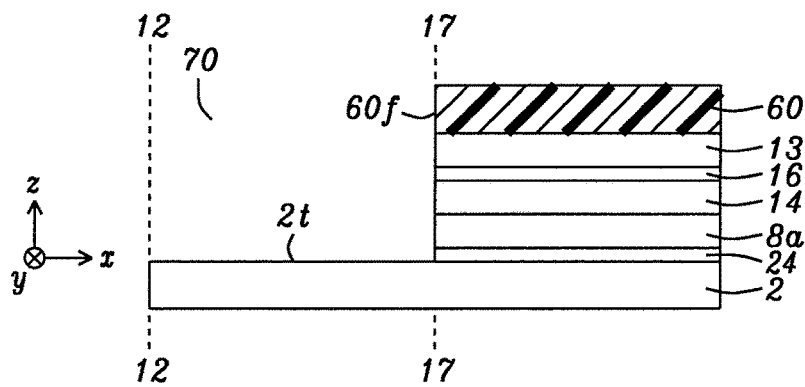
FIGS. 6-9 are down-track cross-sectional views illustrating a sequence of steps for forming the MR sensor shown in FIGS. 3a-3d according to an embodiment of the present disclosure.

The present disclosure also encompasses a fabrication sequence for forming the MR sensor with a recessed AFM layer disclosed herein. Referring to FIG. 6, a down-track cross-sectional view is shown where bottom shield 2 with top surface 2t is provided. Then, AFM layer 8a, ferromagnetic layer 14, AFM coupling layer 16, and ferromagnetic layer 13 are sequentially laid down on the bottom shield. A first photoresist layer 60 is coated on ferromagnetic layer 13 and is patterned by a conventional photolithography method to form a front side 60f that faces the eventual ABS, which is indicated here by plane 12-12. Thereafter, a reactive ion etch (RIE) or ion beam etch (IBE) is performed to remove uncovered portions of underlying layers and stops on top surface 2t to leave an opening 70 between plane 12-12 and plane 17-17 that includes front side 60f.

Figure 7:
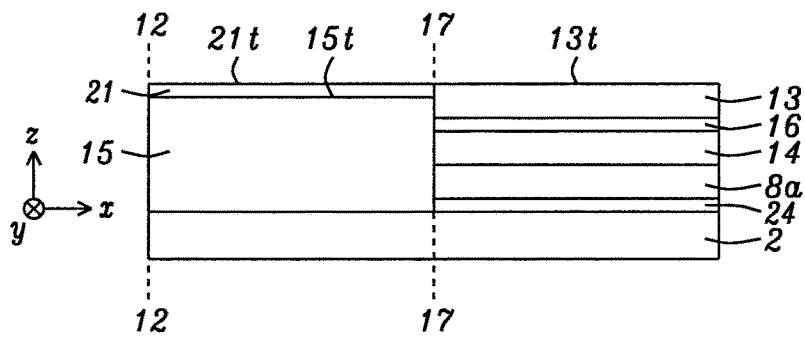

Referring to FIG. 7, bottom shield top portion 15 also known as a shield refill and the seed layer 21 are sequentially deposited on bottom shield top surface 2t to a level that fills essentially all of opening 70 thereby forming a seed layer top surface 21t that is coplanar with top surface 13t on FM layer 13. As mentioned earlier, the shield refill is an extension of bottom shield 2 such that top surface 15t becomes the top surface of a bottom shield top portion. Bottom shield 2 has top surface 2t behind plane 17-17. A chemical mechanical polish (CMP) process may be performed to help flatten top surfaces 21t and 13t.

Figure 8:
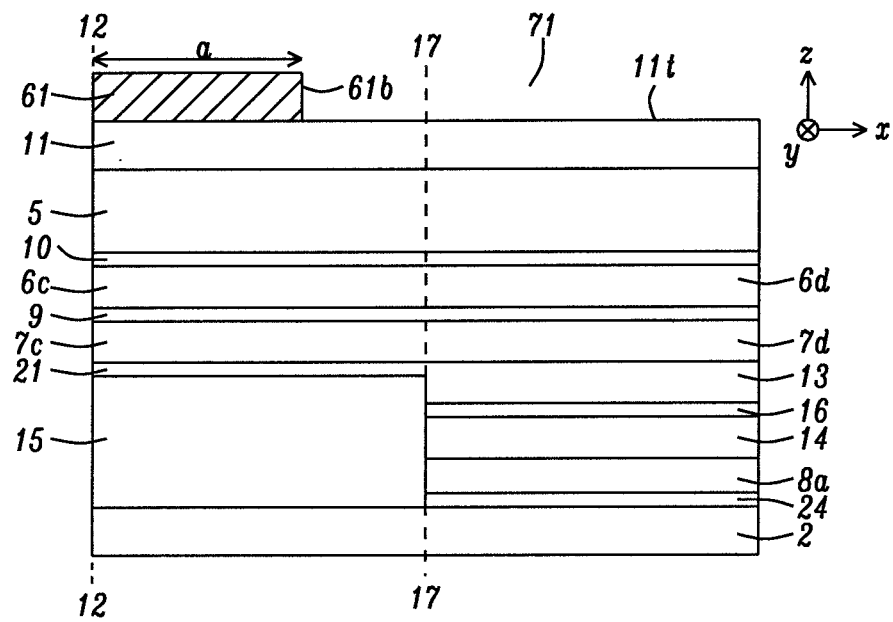

Referring to FIG. 8, AP2 layer 7c/7d, AFM coupling layer 9, AP1 layer 6c/6d, non-magnetic spacer 10, free layer 5, and capping layer 11 are sequentially laid down on seed layer 21 and magnetic layer 13. The aforementioned MR sensor layers may be formed in an Anelva C-7100 thin film sputtering system or the like which typically includes three physical vapor deposition (PVD) chambers each having multiple targets, an oxidation chamber, and a sputter etching chamber. Next, a second photoresist layer 61 is coated on capping layer 11 and is patterned by a photolithography method to generate a photoresist mask having a front side at plane 12-12 and a backside 61b at stripe height distance a from the eventual ABS. Opening 71 exposes a portion of capping layer top surface 11t. It should be understood that the ABS is not defined until a back end lapping process occurs after all layers in the read head and overlying write head are formed in combined read/write head structure. For the purpose of more clearly defining the process flow in this disclosure, the eventual ABS is illustrated as a reference plane 12-12.

Figure 9:
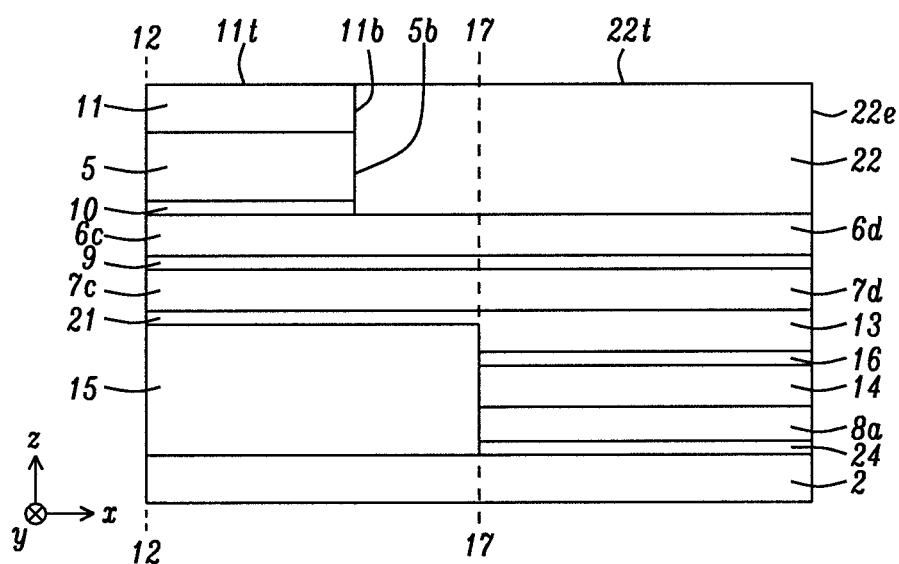

Referring to FIG. 9, patterned photoresist layer 61 is used as an etch mask during a RIE or IBE step that removes portions of the third stack of layers 5, 10, 11 that are not protected by the etch mask. The etching process stops on a top surface of AP1 back portion 6d and on portions of front portion 6c behind free layer backside 5b. Then, isolation layer 22 is deposited forming top surface 22t. A CMP process may be performed to flatten isolation layer top surface 22t that is coplanar with capping layer top surface 11t. Isolation layer 22 is preferably one or more of $Al_2O_3$, TaOx, SiN, AlN, $SiO_2$, MgO, and NiO although other isolation materials known in the art may be employed.

Figure 10:
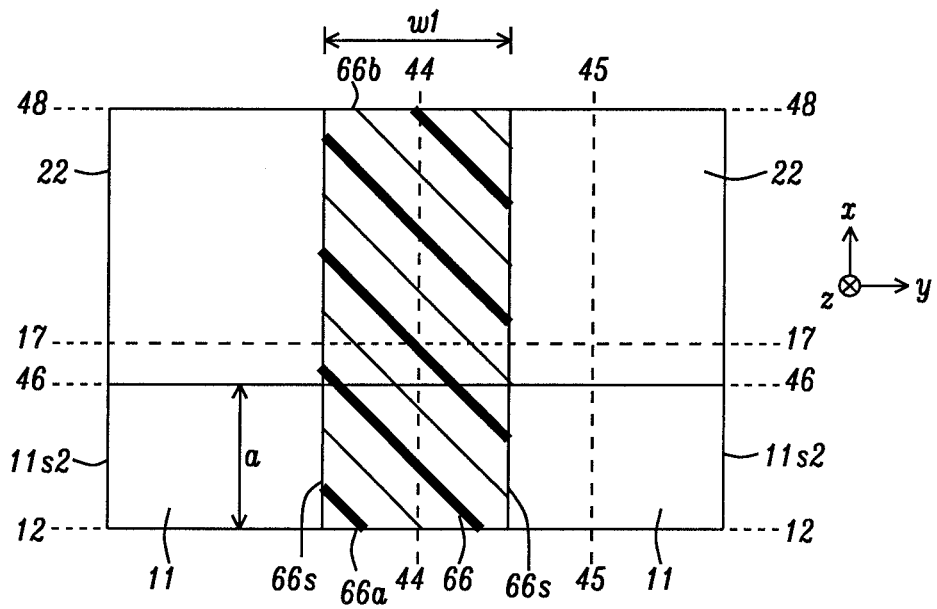
FIG. 10 is a top-down view showing a photoresist pattern used to form sidewalls on the MR sensor structure shown in FIG. 9.

With regard to FIG. 10, a photoresist layer 66 is coated on capping layer 11 and isolation layer 22 and is patterned by a conventional photolithography process to form a photoresist mask having width w1 between sides 66s that extend from a front side 66a at the ABS 12-12 to backside 66b. Portions of capping layer 11 are exposed on either side of center plane 44-44 between a side 66s and a far side of the MR sensor structure at capping layer side 11s2. Portions of isolation layer 22 are exposed on each side of the center plane behind plane 46-46.

Figure 11:
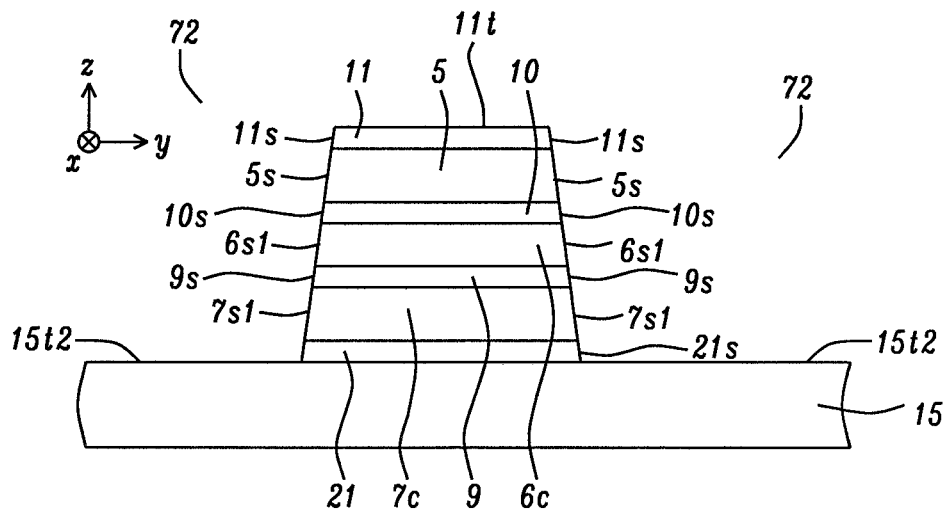
FIG. 11 is an ABS view of the MR sensor structure in FIG. 10 after sidewalls are formed that stop on a top surface of the bottom shield top portion.

Referring to FIG. 11, portions of the third stack of layers below the exposed top surface 11t in FIG. 10 are removed by an IBE process thereby uncovering portions of AP1 layer 6c, AFM coupling layer 9, AP2 layer 7c, and seed layer 21. The IBE milling process is continued to form sides 11s, 5s, 10s, 6s1, 9s, 7s1, and 21s on exposed portions of the capping layer, free layer, tunnel barrier, AP1 layer 6c, AFM coupling layer 9, AP2 layer 7c, and seed layer, respectively. The etching process stops on the shield refill top surface 15t2 and generates an opening 72 on each side of the MR sensor. Isolation layer 22 has a composition that provides a slower IBE milling rate than the second and third stack of layers to prevent etching into AP1 layer 6c/6d behind plane 46-46 in FIG. 10.

Referring to FIG. 12, a top-down view of the MR sensor structure in FIG. 11 is depicted after isolation layer 20 and magnetic layer 23 are sequentially deposited on shield refill top surface 15t2 and on sidewalls of the etched MR sensor layers in the second and third stacks to fill the opening 72 shown in FIG. 11. A CMP process may be used to flatten top surfaces 11t, 20t, 22t, 23t1, and 23t2. Thus, layers 20 and 23 extend from the ABS 12-12 to the sensor backside. In embodiments where a CMP process is not employed at this point, top surface 23t2 remains a greater down-track distance from bottom shield 2 than top surface 23t1 as shown in the down-track cross-sectional view in FIG. 3d.

At this point in the fabrication, another photoresist patterning and etch sequence well known to those skilled in the art may be performed to generate the MR sensor structure shown in FIG. 3d where a backside is formed on the first stack of layers, a backside 6e' is formed on AP1 back portion 6d and on other layers in the second stack, and a backside is formed on isolation layer 20 and magnetic layer 23 at plane 48-48.

The present disclosure also encompasses an annealing step after all layers in the MR sensor structure have been deposited. A first annealing process may be performed to set the magnetization direction of the AP1 layer 6c/6d and AP2 layer 7c/7d by heating the patterned MR sensor to a temperature range of 200° C. to 350° C. while applying a magnetic field along the x-axis direction. A second annealing process is typically used to set the direction of magnetization 15m and 23m in FIG. 3d. If the temperature and/or applied field employed during the anneal of the magnetic layer 23 is lower than during annealing of the first and second stack of layers, the first annealing process may be performed before the second annealing process to maintain the magnetization directions established during the first annealing process.

Figure 13:
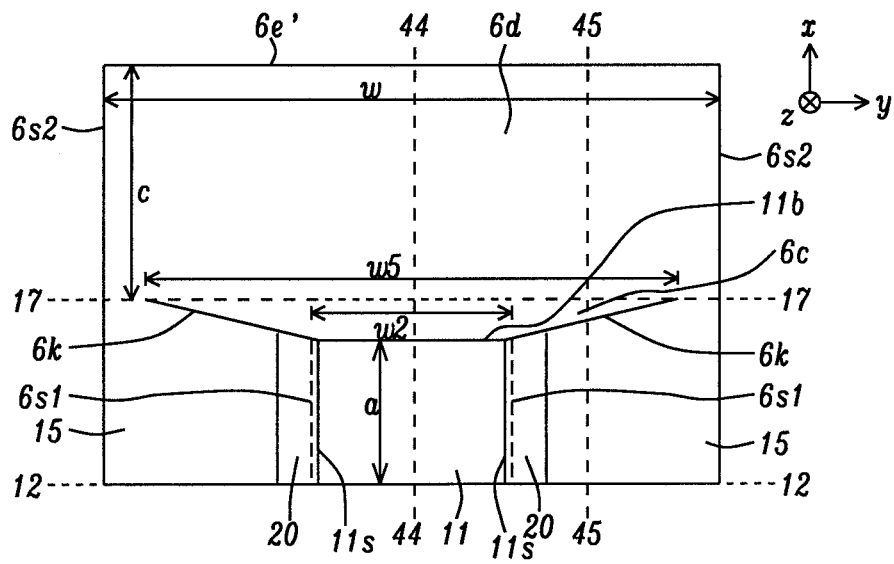
FIG. 13 is a top-down view of a MR sensor structure according to a second embodiment of the present disclosure wherein the SyAP magnetic structure behind the free layer and capping layer in FIG. 3c is modified.

Referring to FIG. 13, the present disclosure also anticipates that the layout of the second stack of layers in the MR sensor of the embodiments disclosed herein may be modified to provide a shape other than a T shape in the front portions thereof. Otherwise, all aspects of the first stack, third stack, and shield refill layer 15 are retained from the previous embodiments. In particular, AP1 layer 6c, AFM coupling layer 9, and AP2 layer 7c are depicted with a first rectangular section of cross-width w2 between sides 6s1, and having a front side at the ABS 12-12 and a back end at height a, and a second section having a trapezoidal shape between a back side of the first rectangular section and plane 17-17. The trapezoid has a front side of cross-track width w2 coinciding with backside 11b of capping layer 11, a backside of cross-track width w5 at plane 17-17, and two diagonal sides 6k that connect the ends of the front side with the ends of the backside. As a result, the second section has an increasing cross-track width with increasing distance from the ABS. In some embodiments, w5 may be equal to full cross-track width w, but in all cases is greater than w2. Preferably, w5 is substantially greater than w2 to enable excellent coupling at plane 17-17 between AP1 layer 6c in the second section and AP1 layer 6d in the back portion. Likewise, there is also considerably more coupling at plane 17-17 between AP2 layer 7c and AP2 layer 7d than in the prior art designs such as FIG. 2b where the AP1 and AP2 layers have a cross-track (coupling) width w5 at an interface at plane 17-17.

The MR sensors described in the various embodiments of this disclosure are readily manufacturable since all of the steps utilize materials and processes already recognized as being acceptable for high throughput fabrication schemes. All embodiments take advantage of a MR sensor structure wherein the AFM layer is recessed behind a shield layer to reduce shield to shield spacing. Meanwhile, pinning strength in the SyAP structure between the AFM layer and free layer in the MR sensor is improved by forming an AP2 (and AP1) layer that is pinned by the AFM layer along a full width of a back portion of the SyAP structure behind the free layer. Furthermore, a better signal to noise ratio is realized to improve the read out signal in the embodiments described herein.

While this disclosure has been particularly shown and described with reference to, the preferred embodiment thereof, it will be understood by those skilled in the art that various changes in form and details may be made without departing from the spirit and scope of this disclosure.

We claim:

1. A method of fabricating a magnetoresistive (MR) sensor wherein an antiferromagnetic (AFM) layer is recessed a certain distance from an air bearing surface (ABS) in order to reduce reader shield spacing, comprising:

(a) providing a bottom shield and sequentially forming a first stack of layers thereon, the first stack comprises a lower AFM layer, and a first ferromagnetic (FM) layer on the lower AFM layer;

(b) removing a front portion of the first stack between a front plane that is an eventual air bearing surface (ABS) and a first plane that is parallel to the front plane and a first height (h1) therefrom thereby forming a first opening, and filling the first opening with a magnetic material to form a top portion of the bottom shield, and a seed layer with a top surface above the bottom shield top portion;

(c) depositing a second stack of layers on the top surface of the first stack and on the seed layer top surface, the second stack has a front portion between the front plane and first plane, and a back portion behind the first plane and is comprised of an AP2 layer with a first magnetization that is pinned by the AFM layer, a first AFM coupling layer on the AP2 layer, and an AP1 layer on the first AFM coupling layer, the AP1 layer has a magnetization in a transverse direction that is opposite to the first magnetization;

(d) depositing a third stack of layers on the second stack and with a front side at the front plane, the third stack comprises a non-magnetic spacer on the AP1 layer, a free layer on the non-magnetic spacer, and an upper capping layer;

(e) removing a back portion of the third stack thereby forming a second opening to expose a top surface of the AP1 layer, each of the third stack layers has a backside that is a second height (h2) from the front plane where h2<h1;

(f) filling the second opening with a first isolation layer; and (g) removing a portion of the second and third stacks to form a third opening on each side of a center plane that is orthogonal to the front plane, the third openings are separated by a first cross-track width and expose the top portion of the bottom shield on each side of the center plane.

2. The method of claim 1 wherein the first stack of layers further comprises a second AFM coupling layer on the first FM layer, and a second ferromagnetic (FM) layer on the second AFM coupling layer, the second FM layer is ferromagnetically coupled to the back portion of the AP2 layer.

3. The method of claim 2 wherein the first and second FM layers, the AP1 layer, and the AP2 layer have a transverse magnetization that is orthogonal to the front plane, and the free layer has a magnetization in a longitudinal direction that is parallel to the front plane in the absence of an external magnetic field.

4. The method of claim 1 wherein the bottom shield top portion is comprised of a single magnetic layer or is an antiferromagnetically coupled structure comprised of a lower magnetic layer formed on the bottom shield, a second AFM coupling layer on the lower magnetic layer, and an upper magnetic layer.

5. The method of claim 1 wherein the first isolation layer is one or more of $Al_2O_3$, TaOx, SiN, AlN, $SiO_2$, MgO, and NiO.

6. The method of claim 1 further comprised of sequentially depositing a second isolation layer and magnetic layer to fill the third openings, the magnetic layer provides longitudinal biasing to the free layer.

7. The method of claim 6 wherein the magnetic layer in the third openings comprises a hard bias layer, or is a junction shield comprised of an antiferro-magnetically coupled configuration having a lower magnetic layer, a middle AFM coupling layer, and an upper magnetic layer.

8. The method of claim 1 wherein the second stack has a T shape from a top-down view wherein a vertical section extends from the front plane to height h2 and has the first cross-track width, and wherein a horizontal section has a full cross-track width between the MR sensor far sides and behind the third stack backside.

9. The method of claim 1 wherein each of the third openings has a rectangular shape and extends from the front plane to a backside of the MR sensor.

10. The method of claim 1 wherein the outer side of each third opening extends to the first height from the front plane and each third opening has a diagonal side extending from the backside of the third stack to the first plane.

* * * * *